Sept. 1, 1942.  E. V. J. TOWER  2,294,638
CLUTCH PLATE AND METHOD OF MAKING SAME
Filed Jan. 3, 1941
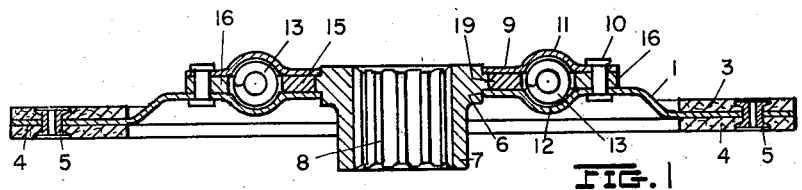
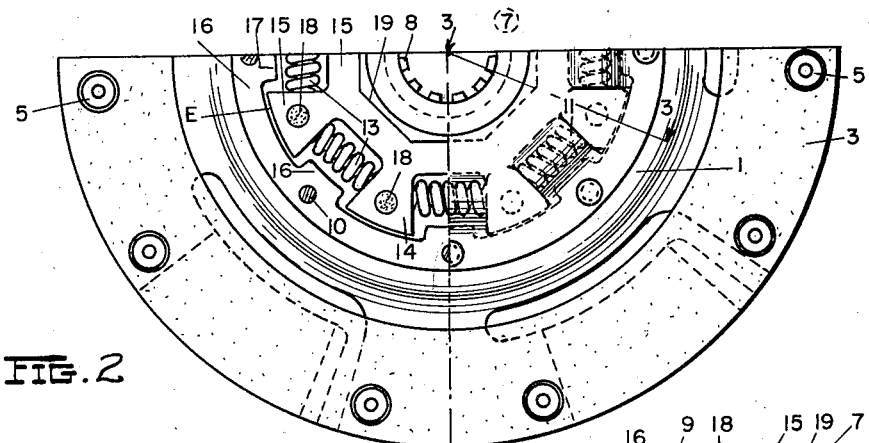
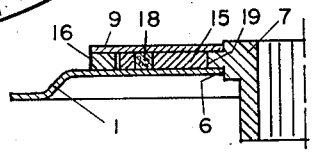
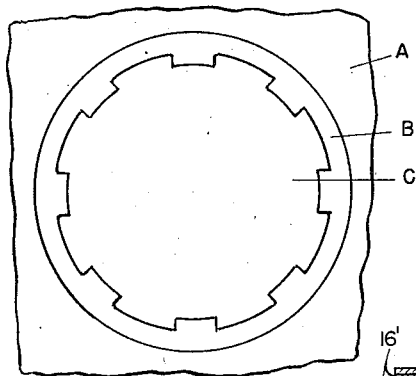
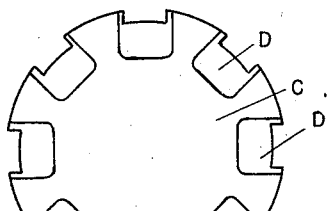
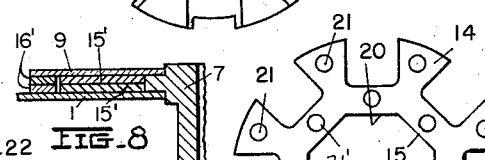
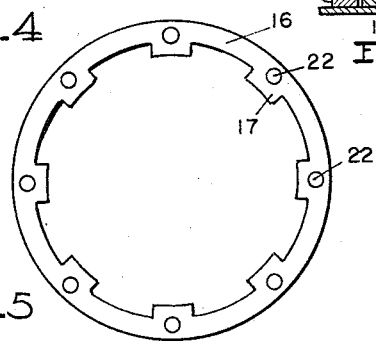
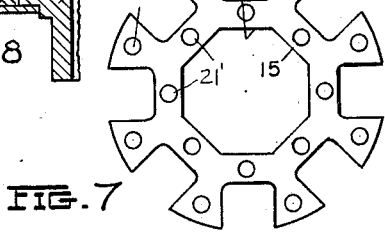
INVENTOR.
ELMER V. J. TOWER.
BY Oberlin, Limbach & Day
ATTORNEYS Patented Sept. 1, 1942

2,294,638

UNITED STATES PATENT OFFICE 2,294,638

CLUTCH PLATE AND METHOD OF MAKING SAME

Elmer V. J. Tower, Grand Ledge, Mich., assignor to The Accurate Parts Manufacturing Company, Cleveland, Ohio, a corporation of Ohio Application January 3, 1941, Serial No. 373,014

14 Claims. (Cl. 192—68)

The present invention relates to a clutch plate and method of making it and has particular reference to a clutch plate wherein a flange element extends radially from the hub proper and is a separate and distinct part but a permanent adjunct thereof. Such flanged hubs are found generally in two types of clutch plates. One type is exemplified by the construction wherein the radially extending flange of the hub overlies the disk body of the plate and is permanently attached thereto by means of rivets passing through both the flange and the disk. The other is the "coil-spring-cushion-center" type of construction.

In the "coil-spring-cushion center" type of clutch plate, coiled compression springs are mounted between the hub element and the disk body of the plate. The hub element and the disk body of the plate are, of course, movably or rotatably mounted with respect to each other and the coil springs are adapted to yieldably absorb the torque or force transmitted from the disk body to the hub so that there is produced a cushioning effect. The hub element of such a clutch plate has heretofore been constructed with an integral flange having radially extending arms or spokes which abut against the end of the coil springs. Such a construction has presented a major problem, both in fabrication of the hub element part and in the production of the optimum desired physical characteristics and properties of the hub element with respect to the clutch plate and other parts of the clutch assembly.

The hub element must, of course, have a female spline fitting upon the male spline of the driven shaft of the clutch assembly. Preferably, the metal of this hub portion proper, of the clutch plate, is to be made softer than the metal of the driven shaft, so that the latter does not become unduly worn during use, so as to require frequent replacement, it being much more economical and convenient to replace the clutch plate rather than the driven shaft, since the former, in any event, is the more susceptible to wear and depreciation during the normal life and use of the clutch assembly. On the other hand, the flange portion of the hub element must possess a metallic hardness, in order to withstand the abutting contact with the rivets or coil springs, which hardness is substantially greater than the optimum desired hardness of the hub portion. Heretofore, when the hub portion and the flange portion of the hub element of such clutch plates were made in one piece or integral with each other, it was necessary to sacrifice some of the desired relative softness in the hub portion and some of the desired relative hardness in the flange portion. Furthermore, such a hub element had to be machined from a single piece of parent stock. This involved, of course, a substantial amount of waste metal, as well as a comparatively high cost of fabrication.

According to my present invention, however, the hub portion and the flange portion are initially fabricated in separate pieces which are subsequently permanently attached together. This permits the respective pieces to be made of the desired relative hardness. Furthermore, the previously required machining operation, with incident waste of material and high cost of production, are substantially reduced, and the flange portion itself may be fabricated from a much more economical metal-shaping process, viz., by stamping or pressing. Furthermore, these flange portions can be made in varied thicknesses by using a plurality of layers or laminations of more than one piece.

My invention possesses a further object and advantage when applied to the construction of a clutch plate wherein a limit stop ring, carried by the disk body and disposed around the outer periphery of the hub flange is employed. Such a limit stop ring construction is more fully shown and described in C. B. Spase U. S. Patent No. 2,124,013, granted July 19, 1938. According to the teachings of my invention, both the limit stop ring and the flange portion of the hub element may be formed from the same piece of parent stock, thus utilizing the large proportion of material heretofore discarded as waste. Furthermore, this latter phase of my invention results in a more accurate and uniform control of the dimensional specifications of the limit stop ring and the flange portion of the hub, particularly with respect to their interfitting dimensional requirements.

The foregoing objects and advantages, as well as additional ones, will be pointed out in greater detail as the following description proceeds.

To the accomplishment of the foregoing and related ends, said invention, then, consists of the means and elements hereinafter fully described and particularly pointed out in the claims.

The annexed drawing and the following description set forth in detail certain structure embodying the invention and as applied to a "coil-spring-cushion-center" clutch plate, such disclosed elements constituting, however, but one of various structural forms in which the principle of the invention may be used.

In said annexed drawing:

Fig. 1 is a cross-sectional view of a coil-spring-cushion center clutch plate constructed according to the principle of my invention; Fig. 2 is a plan view of the clutch plate shown in Fig. 1 and with a portion removed; Fig. 3 is a detailed sectional view, taken substantially along the line 3—3 of Fig. 2; Figs. 4 to 7, inclusive, are plan views illustrating the several steps of my new method for fabricating the flange portion of the hub element and the limit stop ring from a single piece of parent stock; and Fig. 8 shows an alternative form of construction wherein the hub flange and stop ring are of laminated form.

Now referring more particularly to the drawing, there is shown therein a clutch plate having a disk body 1 to whose outer periphery the friction facing rings 3 and 4 are attached by means of the rivets 5. The disk body 1 has a central opening 6 in which the hub 7 is received. The hub 7, in turn, has a female spline adapted to fit upon the male spline of the driven shaft of the clutch assembly (not shown).

A cover plate or side plate 9 is attached to the disk body 1 by means of the rivets 10. The cover plate 9 and the disk body 1 have aligned or registering sumps or pockets 11 and 12, respectively, in which the coil springs 13 are received, and against the ends of which these springs contact and abut.

The ends of the springs 13 also contact and abut against the sides of the radially projecting arms or spokes 14 on the hub flange portion 15. A limit stop ring 16 has integrally projecting lugs or bosses 17, which circumferentially overlap the radial arms or spokes 14 and thus provide limit stops for limiting the amount of rotation of the flange 15 with respect to the disk body 1.

Friction inserts 18, composed of cork, fibre, asbestos, or friction material, are inserted in holes 21 in the radial arms or spokes 14 or the holes 21' adjacent the inner periphery of the flange portion 15 and are adapted to bear against the contiguous flat surface portions of the disk body 1 and cover plate 9, thus producing a light, frictional engaging action between the hub portion and the disk portion of the clutch plate, and in aid of the yieldable cushioning action of the coil springs 13. The hub 7 has a polygonally-shaped outer surface portion 19 (octagon-shaped, as shown in the drawing) upon which the flange 15 is press-fitted, so that the two parts are fixedly and permanently assembled together.

It will thus be seen that the hub 7 and the flange 15 are two separate pieces permanently assembled and attached together. Thus, the hub 7 may be fabricated from a relatively soft, low carbon steel which readily lends itself to machining operations, such as involved in the broaching of the internal or female spline 8 and the flange 15 may be stamped or pressed from a relatively harder, higher carbon steel; and the flange 15 may be separately heat-treated to improve its properties of hardness and toughness without detracting from the desired property of relative softness of the hub 7, which would otherwise be the case if these two parts were fabricated from a single piece.

It will be obvious to those skilled in the art that although the previous example specifies low carbon steel and high carbon steel as the metallic stock from which the hub 7 and flange 15 may be fabricated, that other metals, including non-ferrous metals, may be equivalently employed for the fabrication of these two parts.

The method of fabricating the stop ring 16 and the flange 15 from a single piece of stock is illustrated in Figs. 4 to 7, inclusive. Thus, a piece of flat or strip stock A is first operated upon to stamp or press out the stop ring form B and the preliminary or rough blank C for the flange, as shown in Fig. 4. Heretofore, the amount of metal represented by the portion C would have been just so much waste material, but this portion of material now serves as a blank for forming the hub flange 15. As shown in Fig. 6, the portions D are removed from the rough blank C to form the radial arms 14 and intervening recesses for the coil springs 13. The central, polygonal opening 20 is also stamped out to interfit with the correspondingly shaped outer surface portion 19 on the hub 7. The holes 21 are stamped out to receive the inserts 18, of finished flange 15, as shown in Fig. 7. The finished stop ring 16 in which the rivet holes 22 have been added is shown in Fig. 5.

The above-described process of fabrication permits a very accurate and uniform control of the dimensional specification limits between the flange 15 and the stop ring 16. Thus, as indicated at E in Fig. 2, it will be seen that there is a fitting or clearance space between the outer ends of the spokes 14 and the inner periphery of the stop ring 16. When the stock or rough blank C for the flange 15 is stamped or pressed from the same blank A from which the stop ring blank B is taken, it will be appreciated that this interfitting relationship of the flange 15 and the stop ring 16 must necessarily always be maintained. Heretofore, it was necessary to very carefully machine and check the dimensions of the flange on the hub to make sure that it would properly conform to dimensions interfitting with the dimensions of the inner periphery of the stop ring. The specification of closer tolerance limits for these dimensions are also made possible by reason of my process of fabrication, so that the clearance space E may be made quite close indeed, as compared to previous feasible manufacturing limits, and thus contributing in a greater measure to the precision of fit and alignment of the clutch plate parts.

The flange 15 or the stop ring 16, as shown in Figs. 7 and 5 respectively, may, of course, be subsequently heat-treated to improve their properties of hardness, toughness and strength, and before final assembly in the clutch plate.

It will be apparent to those skilled in the art that equivalent means for permanently mounting or attaching the flange 15 upon the hub 7 may be employed, such as by using a different shape of interfitting surface, other than the octagonal shape shown in the drawing, or by other methods of attachment and press-fitting, such as brazing, or welding, all being equivalently available expedients within the scope of my invention.

In Fig. 8, I have shown a modified form of construction wherein the hub flange portion and the limit stop ring are themselves composed of a plurality of pieces, viz., are laminated. Thus, referring to Fig. 8, it will be seen that the hub flange portion is composed of the two radially parallel pieces or layers 15' and 15' and the stop ring is similarly composed of the two layers 16' and 16'. This laminated construction possesses an advantage in that the thickness of the hub flange portion, particularly, may be more conveniently controlled in commercial manufacturing practice. By building the hub flange portion with a plurality of layers, it is possible to produce a substantial number of thicknesses for the hub flange and for the stop ring from a relatively small number of sheet stock sizes. In other words, it is not necessary to have on hand sheet stock for making the hub flange and the stop ring, which is of a thickness or size corresponding to each and every size and thickness of the flange and stop ring desired to be made. Furthermore, this laminated construction imparts greater strength to the hub and clutch disk assembly against axially directed stresses. A plurality of thicknesses of metal stock, or the laminated construction, permits the clutch plate, as a whole, to withstand forces tending to distort the body or disk portion of the clutch plate with respect to the hub portion.

It will also be understood that although I have specifically illustrated and described my invention as applied to a coil-spring-cushion-center type of clutch plate, that it may be equally well and equivalently applied to that type of clutch plate construction in which the radially extending flange portion of the hub overlies and is rigidly or immovably attached to the disk body of the clutch plates, such as by rivets or similar fastening means. Such latter application of the invention being quite obvious to those skilled in the art, in view of the foregoing description, it has not been deemed necessary specifically to illustrate and describe it.

Other forms may be employed embodying the features of my invention instead of the one here explained, change being made in the form or construction, provided the elements stated by any of the following claims or the equivalent of such stated elements be employed, whether produced by my preferred method or by others embodying steps equivalent to those stated in the following claims.

I, therefore, particularly point out and distinctly claim as my invention:

1. A hub element for a clutch plate having coil springs mounted between such element and its disk body, comprising a hub and a spring-abutting flange, said hub and said flange, respectively, having interfitting surface portions of non-circular cross-sectional shape being composed of metals of different hardness, the axial width of said interfitting portions being equal to the thickness of said flange.

2. A hub element for a clutch plate having coil springs mounted between such element and its disk body, comprising a hub and a spring-abutting flange, said hub and said flange being initially separate and having non-rotatable, interfitting axially extending surface portions of polygonal cross-sectional contour, said flange being subsequently press-fitted on said hub.

3. A clutch plate, comprising a hub, a flange on said hub, a disk body overlying one side of said flange and a side plate overlying the other side of said flange, radially extending arms on said flange, coil springs mounted between said radially extending arms, spring-receiving pockets for said coil springs in said disk body and in said side plate and friction inserts in said radial arms adapted to frictionally engage with said disk body and with said side plate.

4. In the method of making a clutch plate having a hub element, a disk body and coil springs mounted therebetween, the steps of machining a hub, stamping a spring-abutting flange to fit on said hub, heat-treating said flange to a different hardness than that of said hub, and then press-fitting said flange on said hub.

5. In the method of making a clutch plate having a hub element, a disk body and coil springs mounted therebetween, the steps of machining a hub, providing a blank, forming a limit stop ring from a portion of said blank and forming a spring-abutting flange to fit on said hub from the remaining portion of said blank previously circumscribed by said ring.

6. In the method of making a clutch plate having a hub element, a disk body and coil springs mounted therebetween, the steps of machining a hub, providing a blank, forming a limit stop ring from a portion of said blank and forming a spring-abutting flange to fit on said hub from the remaining portion of said blank previously circumscribed by said ring, heat-treating said flange to a different hardness than that of said hub, and then press-fitting said flange to said hub.

7. A hub element for a clutch plate having coil springs mounted between such element and its disk body, comprising a hub and a spring-abutting flange, said hub and said flange being initially separate and having interfitting non-circular surface portions, said flange being subsequently, fixedly mounted on said hub, and said flange being composed of a plurality of radially parallel flat layers.

8. A clutch plate having a hub element and a disk body rotatably carried upon said hub element, the latter comprising a hub and a radially extending flange forming a part thereof and overlying said disk body, said hub and said flange, respectively having interfitting surface portions of non-circular cross-sectional shape and being composed of metals of different physical properties.

9. A clutch plate having a hub element and a disk body rotatably carried upon said hub element, the latter comprising a hub and a radially extending flange forming a part thereof, said hub and said flange being initially separate, said flange being subsequently, fixedly mounted on said hub, an external, non-circular surface portion on said hub having an axial width equal to that of said flange, a complementary internal surface portion on said flange for non-rotatably fitting over said hub surface portion, and an external circular surface portion on said hub for rotatably fitting within said disk body.

10. A clutch plate having a hub element, a disk body having a circular opening for receiving said hub element, coil springs mounted between said hub element and said disk body, said hub element comprising a hub and a spring-abutting flange, said hub having an outer surface portion of polygonal cross-section, said flange having a central opening of similar cross-sectional shape and adapted to be tightly fitted on said outer hub surface.

11. A clutch plate having a hub element, a disk body having a circular opening for rotatably receiving said hub elements, coil springs mounted between said hub element and said disk body, said hub element comprising a hub and a spring-abutting flange, said hub and said flange respectively being composed of metals of different physical properties and being initially separate and subsequently, fixedly assembled together, an external polygonal surface portion on said hub, said flange having a central opening of similar polygonal shape and adapted to be non-rotatably fitted thereover, and a circular external surface portion on said hub for rotatably fitting with said circular opening in said disk body.

12. A clutch plate having a hub element, a disk body rotatably mounted on said hub element, coil springs mounted between said hub element and said disk body, said hub element comprising a hub and a spring-abutting flange overlying said disk body, said hub and said flange, respectively being composed of metals of different physical properties and being initially separate and subsequently press-fitted together.

13. A clutch plate having a hub element, a disk body rotatably mounted on said hub element and having a central circular opening to receive the same, coil springs mounted between said hub element and said disk body, comprising a hub and a spring-abutting flange overlying said disk body, said hub and said flange, respectively being composed of metals of different hardness, said hub having a portion of its outer surface of polygonal cross-section, said flange having a central opening of similar cross-sectional shape and adapted to be tightly fitted on said outer hub surface, and another portion of the outer surface of said hub being circular to fit within said circular opening in said disk body.

14. A clutch plate having a hub element, a disk body rotatably mounted thereon, coil springs mounted between said hub element and said disk body, said hub element comprising a hub and a spring-abutting flange, said hub and said flange, respectively being composed of metals of different hardness, said hub having an outer surface portion of polygonal cross-section, and of an axial width equal to the thickness of said flange, said flange having a central opening of similar cross-sectional shape and adapted to be tightly fitted on said hub surface portion, said flange being composed of a plurality of radially parallel, flat layers, and another outer surface portion of said hub of circular cross-section and adapted to fit within said disk body.

ELMER V. J. TOWER.